June 23, 1964   J. E. LYDLE   3,138,182
MACHINE FOR CHANGING TIRES
Filed Dec. 6, 1961   2 Sheets-Sheet 2
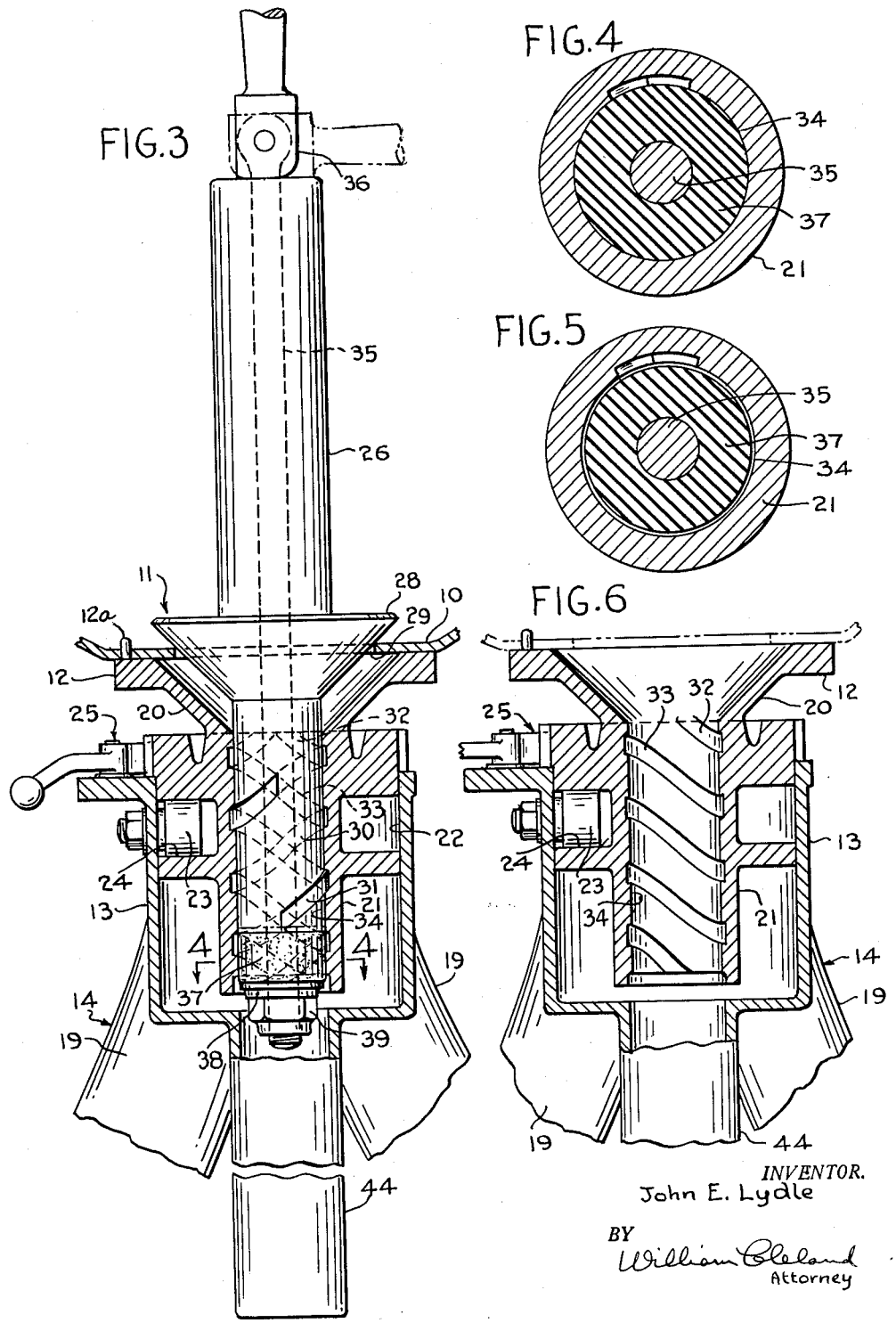
INVENTOR.
John E. Lydle
BY William Cleland
Attorney

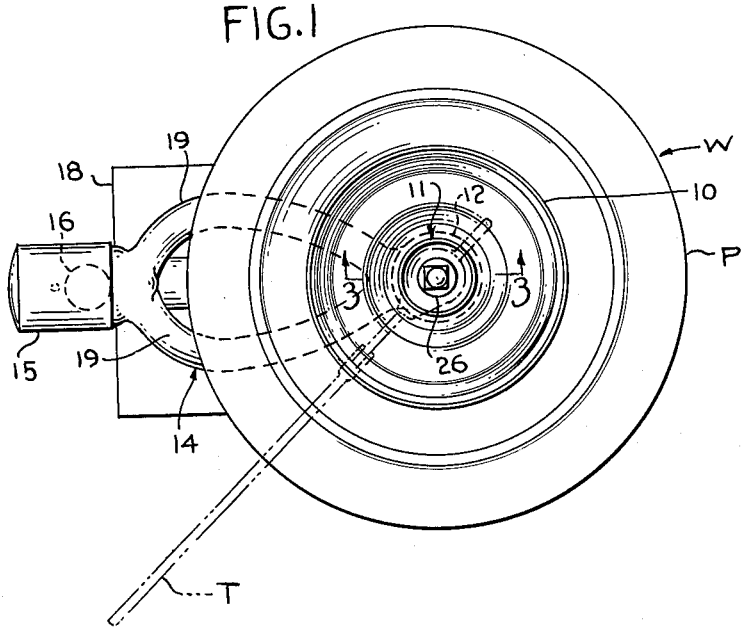
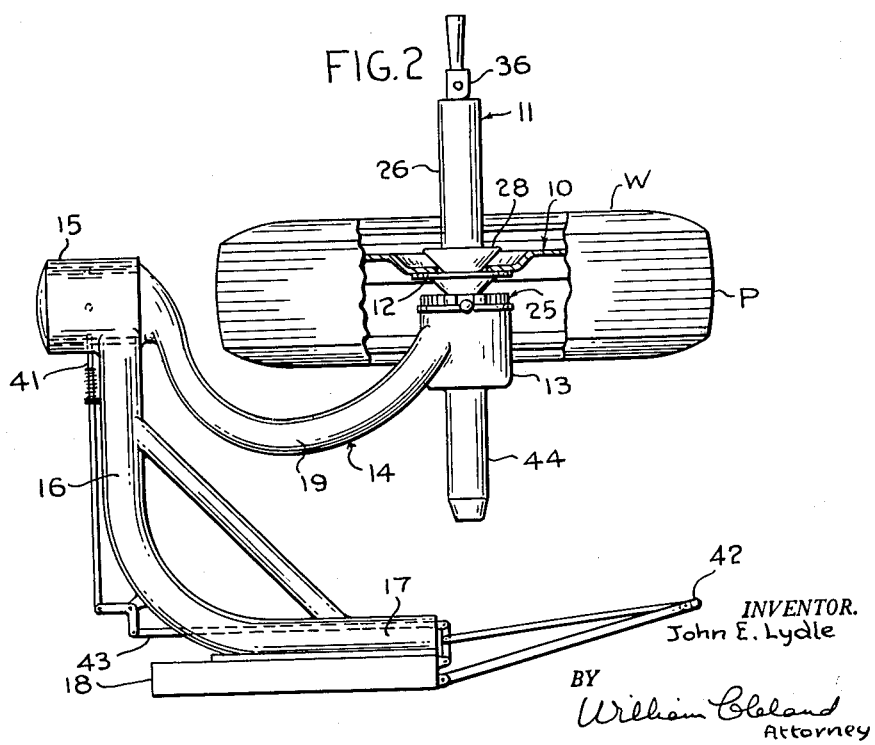

United States Patent Office 3,138,182
Patented June 23, 1964

3,138,182
MACHINE FOR CHANGING TIRES
John E. Lydle, Box 1094, Akron, Ohio
Filed Dec. 6, 1961, Ser. No. 157,489
3 Claims. (Cl. 144—288)

This invention relates to a tire changing machine and in particular relates to a machine for mounting and demounting pneumatic tires with respect to vehicle wheels.

In the past, tire changers have been provided with removable hold-down devices for clamping a vehicle tire and wheel assembly onto a supporting table for the same. These tire changers, however, have been objectionable for various reasons, such as, that they were awkward to handle, or that they required too much time to adjust into position to clamp the assembly on the supporting table. Some of these devices were unsatisfactory because there was no reliable way to determine if the locking means for the same were in fully locked condition.

This application is a continuation in part of co-pending John E. Lydle et al. U.S. Patent application, Serial No. 798,667, filed March 11, 1959, now Patent No. 3,050,096.

One object of the present invention is to provide a tire changing machine of the character described, including an improved wheel-clamping unit which is adapted to be quickly releasably attachable to the supporting table, and to clamp the tire and wheel assembly to the table.

Another object of the invention is to provide an improved clamping unit which is substantially self-operating to move into clamping position, and which is provided with quickly operable means to lock the unit in full, safe and effective clamping relationship.

Another object of the invention is to provide a tire changing machine of the character described having means for quickly positioning and clamping the tire and wheel assembly on a supporting table for the same in a minimum of time and with a maximum of safety to the operator.

These and other objects of the invention will be manifest from the following brief description and the accompanying drawings.

FIGURE 1 is a top plan view of a tire changing machine embodying the features of the invention.

FIGURE 2 is a front elevation of the same, partly broken away and in section.

FIGURE 3 is an enlarged fragmentary cross-section taken substantially on the line 3—3 of FIGURE 1, and illustrates an improved clamping unit in locked position to clamp a wheel and tire assembly on the machine.

FIGURE 4 is a further enlarged horizontal cross-section taken substantially on the line 4—4 of FIGURE 3, and illustrates locking means in locked condition to maintain the unit in clamping condition.

FIGURE 5 is a view corresponding to FIGURE 4, but illustrates the locking means in released condition.

FIGURE 6 is a view corresponding in part to FIGURE 3, but illustrates the tire mounting table with the clamping unit removed.

Referring particularly to FIGURES 1, 2 and 3, there is illustrated a tire changing machine embodying the features of the invention, wherein a wheel 10 of a tire and wheel assembly W is releasably clamped, by means of a clamping unit 11, onto a table 12. This table is rotatably mounted in a cylindrical hub 13 of a freely extending arm 14, journalled at its opposite end within a bearing 15 affixed on the upper end of a supporting upright 16. The upright 16 is of tubular material and has an angularly extending portion 17 suitably affixed on a supporting base 18, which may be bolted to the floor. The upright 16 is generally in a vertical plane including the axis of rotation of arm 14 in bearing 15. As best shown in FIGURES 1 and 2, the arm 14 is formed with two tubular branches 19, 19 which are arcuately offset with respect to said axis of rotation in direction generally in a plane including said axis and the axis of rotation of table 12. The branches 19, 19 define a generally ovate or lune-shaped configuration to have the widest portions disposed at opposite sides of said plane. The offset arcuate shape of arm 14 facilitates mounting the wheel assembly on a table 12, as by rolling the assembly from the floor onto the lowermost arcuate portions of the arm branches 19, 19 as viewed in FIGURE 2, and then tilting the assembly flat-wise to centered position on the table 12. This operation is further facilitated by initial self-centering engagement of the tire between the ovately arranged branches 19, 19 (see FIGURE 1).

As best shown in FIGURES 2 to 6, the table 12 constitutes an annular flange, out-turned from a conical wall 20, which converges downwardly to a stem portion 21 rotatably received in a cylindrical recess 22 in hub 13. The stem portion 21 is retained against axial movement in the hub recess 22, as by means of one or more rollers 23 rotatably mounted on the hub wall to roll in an annular groove 24 provided in the stem portion 21. Adjustable pawl and ratchet means 25, of known type, may be provided between the hub 13 and the stem portion 21 to permit selective operation for one-way ratcheting of the table 12 in either direction, or to be free for rotation in either direction.

The aforementioned clamping unit 11 is in the nature of a combined wheel clamp and tool centering post unit. As best shown in FIGURES 3–5, the unit 11 includes a freely extending cylindrical post 26, having affixed thereon a downwardly converging conical enlargement 28 for self-centering reception in the usual hub recess 29 of metal wheel 10. A cylindrical downward extension 30 of post 26 may have thereon a single external thread 31 for selective threaded engagement in one or other of two separate internal thread grooves 32 or 33, arranged in parallelism within a cylindrical bore 34 through the stem portion 21. For this purpose, therefore, it follows that the two grooves 32 and 33 must necessarily present separate open ends at the upper end of the cylindrical bore 34. The pitch and lead of the thread 31 are in effect the same, and are of such substantial extent that after initial insertion of the extension 30 into the bore 34, the extension 30 will advance substantially to the clamping position shown in FIGURE 3 in approximately one and one-half revolutions of the clamping unit 26 (see FIGURE 3), whether the extension is threaded into the thread groove 32 or the thread groove 33. The "lead," as referred to above, is the distance the extension 30 will advance during one revolution of unit 26. In any event, the arrangement is such that the weight of the clamping unit 26 alone is sufficient to cause the same to thread the extension 30 into the bore 34 by gravity. To assure complete locking of the clamping unit 11 in clamping position, and at the same time apply further clamping pressure of the unit against the wheel 10, a rod 35 may be axially shiftably received through the post 26 and the extension 30 thereof. A manually operable cam element 36 may be pivoted on the upper end of the rod for camming engagement with post 26, and a cylindrical block or body 37 of rubber-like resilient material is retained between the inner end of the extension 30 and a retaining collar 38, threaded or otherwise adjustably retained on the rod 35, and a nut 39 threaded on the rod. In the released condition of the block 37 it is somewhat loosely received within the bore 34, as shown in FIGURE 5, to facilitate free sliding reception of the extension within the bore, as previously described. When the clamping unit has been positioned in the clamping position of FIG- URE 3 the locking and tightening action is easily accomplished by turning the cam member 36 from the chain-dotted position thereof to the full line position, as shown in FIGURE 3. This action is effective to urge the rod 35 upwardly with respect to the post 26, thereby applying compression to the rubber-like block 36, first to expand the block into yielding gripping action with the lower end of the bore 34 which anchors the rod 35, and then, with further compression of the block, to urge the post 26 downwardly to apply additional clamping pressure of conical member 28 against the wheel 10. At this point the additional clamping and turning movement of post 26 may be relatively slight, but in any event any such axial movement in conjunction with conventional clearances between the internal and external thread portions allow the anchored elastic block 37 to be further compressed by said operation of the cam 36, and thereby to apply a strong wedging action between the opposingly interengaging internal and external thread portions. Accordingly, the resilient block 37 serves a dual function, namely, as means for anchoring the rod 25 to the stem 21, and as a locking device, in the nature of a lock-nut, which binds or locks said thread portions against loosening of the extension 30 within the stem which in turn might allow the elastic block 37 to relax its anchoring grip with respect to stem 21. Conversely, the tight threaded connection holds the block 37 in distended anchoring condition. In actual practice it has been found that the clamping unit 11 may be inserted into the bore 34 and into full clamping condition within a few seconds. The additional downward clamping movement of extension 30 as described is effective to apply a strong wedging action within the interengaging portions of the external and internal screw portions which is very effective to hold the clamping unit 26 in firm clamping relationship with respect to the wheel 10.

The tire and wheel assembly are adapted to be rotated about the axis of the clamping unit 11 and also to be rotated with the arm 14 about the horizontal axis through the bearing 15. Spring-pressed indexing means 41 is operable by pressure applied to a foot treadle 42, and through a suitable linkage mechanism 43, to permit rotation of the arm 14 in the bearing 15 to a selected position in which the indexing means is spring-pressed to lock the arm against further rotation.

When the apparatus is used in the condition shown in FIGURE 2, the center post 26 may be used in various ways as a pivotal or fulcruming element for mounting or demounting the tire on wheel 10 by use of various tire tools of known type. As for example, tire tools of the type referred to or illustrated in aforementioned pending patent application 798,667. When the arm 14 is rotated to an inverted position from that shown in FIGURE 2, an integral post for extension 44 on the hub 13 is likewise adapted to be utilized as a pivotal or fulcruming member for working on the corresponding side of the tire.

In use of the machine for removing a tire from a wheel 10, for example, the tire and wheel assembly W are rolled onto the lowermost arcuate portion of the arm 14, in the locked position thereof shown in FIGURES 1 and 2, in which the post unit 11 is removed (see FIGURE 6). By centering the tire between the arm branches 19, 19, the assembly may easily be tilted to position wheel 10 in flatwise, substantially centered relation on table 12, with dowel pin 12a received in a hole in wheel W for that purpose, as indicated in chain-dotted lines in FIGURE 6. Next, the clamping unit 11 is axially centered over the hub 13, with the cam 36 in the released condition indicated in the chain-dotted lines in FIGURE 3, to permit starting the inner end of extension 30 into the double-threaded passage 34 of stem 21, in which the thread 31 of the extension has a chance of entry into one or other of the thread grooves 32 and 33 (see full and chain dotted lines in FIGURE 3). At this point, slight rotational adjustment and timely release of the unit will permit the same, by its own weight, to thread the extension 30 into the selected thread groove, and thereby self-operatively to turn the unit to position it in the self-centering clamping position of the conical enlargement 28 with respect to wheel 10, as best shown in FIGURE 3 (see also FIGURES 1 and 2). The operator now may urge the cam lever 36 from the chain-dotted position of FIGURE 3 to the full-line position shown therein, whereby rubber block 37 is compressed against the end of extension 30 as previously described, first to expand and grip the wall of the passage 34, anchoringly to retain the rod 35 against upward axial movement with respect to stem portion 21, and then to urge the extension 30 axially inwardly to apply further clamping pressure of the conical enlargement 28 against wheel 10. As previously described this last mentioned inward movement of extension 30 is also effective to apply a powerful wedging action between axially opposed, complementally engaging portions of the threads and thread grooves, to lock the clamping unit in the wheel-clamping condition thereof.

In the position of the machine best shown in FIGURES 1 and 2 a suitable lever-type tool T, may be rotated on post 26 in known manner, or as described in the aforesaid co-pending patent application, to position the upper bead of tire P on the wheel 10. Lever-type tools of known construction may be fulcrummed against post 26, either for mounting or demounting tires. In any event, the other bead of the tire may likewise be operated upon by use of the post 44 as a fulcrum, while the arm 14 is fixed in an inverted position from that shown in FIGURES 1 and 2.

When the tire has been mounted on the wheel 10, the arm 14 may be adjusted back to the position shown in FIGURES 1 and 2, in which the post unit is easily removable by reverse turning movement of post 26 with respect to the stem portion 21, after first releasing the cam lever 36 to contract the rubber block 37. The tire and wheel assembly W is then easily removed by tilting the same to vertical position onto the arcuate arm branches 19, 19 and then rolling the assembly from the arm onto the floor or supporting surface.

Thus has been provided a simple, compact machine by which tires may be mounted or demounted with a minimum of manual effort, and with a minimum expenditure of time.

Modifications of the invention may be resorted to without departing from the spirit thereof or the scope of the appended claims.

What is claimed is:

1. A device for supporting a pneumatic tire and wheel assembly comprising: a support having thereon a wheel-mounting member provided with a passage opening axially outwardly of the same; a clamping unit including a wheel-engaging and an inward extension thereon for reception through the usual central opening of the wheel mounted on said member toward a position of clamping engagement of said element with the wheel; said member passage and said extension having complementally interengageable spiral thread portions of substantial lead sufficient to facilitate rapid threaded operation of said extension within the passage toward and from a said clamping position of the clamping element; and adjustable locking means on the inner end of said extension and having adjustment means for adjustment of the locking means with respect to the extension initially to anchor the locking means to said member and then axially to shift the clamping unit relatively of the anchored locking means to apply binding action between the interengaged thread portions to lock the clamping unit against threaded retraction with respect to the member; said threaded passage including a plurality of internal threads opening at the outer end of the passage for selective threaded reception of a said external thread of the extension to facilitate initial inward said threaded reception of the extension within the passage.

2. A device as set forth in claim 1, said adjustment means including a rod extending from said locking means axially through said clamping unit and having retaining means affixed thereon at the inner end of said extension; and said locking means including a body of elastic material retained between the inner end of the extension and said retaining means; operating means being provided for urging said rod and the retaining means thereon axially outwardly of the member yieldingly to expand said body into gripping relation to the passage wall and then to urge said threaded extension axially of said member to apply said binding action between said thread portions.

3. A device as set forth in claim 2, said operating means including a cam lever pivoted on the outer end of said rod and having a cam portion engageable with a portion of said clamping unit for axially moving said rod relatively of said clamping unit.

References Cited in the file of this patent

UNITED STATES PATENTS

| | | |
|---|---|---|
| 1,317,526 | Savage et al. | Sept. 30, 1919 |
| 1,550,651 | Charter | Aug. 18, 1925 |
| 2,201,982 | Bazarek | May 28, 1940 |
| 2,233,371 | Smith | Feb. 25, 1941 |
| 2,490,233 | Schildmeier | Dec. 6, 1949 |
| 2,546,849 | Branick | Mar. 27, 1951 |
| 2,818,095 | Stahl et al. | Dec. 31, 1957 |

FOREIGN PATENTS

| | | |
|---|---|---|
| 1,215,657 | France | Apr. 20, 1960 |